Feb. 5, 1924.
1,482,471
W. W. LANDSIEDEL
ADDING AND CALCULATING MACHINE
Filed June 3, 1921
5 Sheets-Sheet 4

INVENTOR.
WALTER W. LANDSIEDEL,
BY
HIS ATTORNEYS.

INVENTOR.
WALTER W. LANDSIEDEL.
BY
Rippey & Kingsland,
HIS ATTORNEYS.

Patented Feb. 5, 1924.

1,482,471

UNITED STATES PATENT OFFICE.

WALTER WM. LANDSIEDEL, OF NORWOOD, OHIO, ASSIGNOR TO THE DALTON ADDING MACHINE COMPANY, OF CINCINNATI, OHIO, A CORPORATION OF OHIO.

ADDING AND CALCULATING MACHINE.

Application filed June 3, 1921. Serial No. 474,747.

*To all whom it may concern:*

Be it known that I, WALTER W. LANDSIEDEL, a citizen of the United States, residing at Norwood, Hamilton County, and State of Ohio, have invented a new and useful Adding and Calculating Machine, of which the following is a specification.

This invention relates to adding and calculating machines.

An object of the invention is to provide novel and efficient equipment for use in an adding and calculating machine to facilitate the operation of the machine in multiplication work where a constant multiplicand is employed in different examples.

In the specific form shown in the drawings, the invention is embodied in a machine of the Dalton type, although the invention is not restricted to use in a machine of that specific construction. It is apparent that the invention may be used in other machines in which the differential mechanism is cooperatively related with a carriage under control of numeral keys and in which the differential stops are set by the cooperation of the carriage and the keys.

Another object of the invention is to provide novel means whereby the pins in the transversely movable carriage may be returned to their normal or idle positions, as an incident to the movement of the carriage to its home or starting position, or not, as desired.

Another object of the invention is to provide a novel and simple means for controlling and positioning the differential mechanism to facilitate multiplication where a constant multiplicand is employed. Although the number of digits or figures in different multiplicands vary, the utility of the invention is not diminished, for in such cases cipher pins may be set in the higher numerical orders in the differential mechanism leaving the active figures of the multiplicand in the lower numerical orders in the differential mechanism where the multiplicand includes less than the whole number of digits or figures required to place one such digit or figure in each numerical order. For instance, assuming that the effective position of the carriage is that in which stops or pins may be set to represent eight digits or figures in a multiplicand; if the multiplicand to be used contains only seven figures, then one cipher will be set in the highest numeral order; or, should the multiplicand to be used contain only six digits or figures, then two ciphers will be set in the two highest numeral orders, and so on.

An additional object of the invention is to provide effective means settable as an incident to the placing in use of the present invention to lock the numeral keys of the machine against operation when the carriage is in its home or normal position, thereby preventing operation of the carriage under control of the numeral keys until the mechanism of the present invention has been placed out of use.

Another object of the invention is to provide means for clearing the differential mechanism while the controlling carriage therefor is in its home or normal position, thereby placing the carriage in condition for control by the numeral keys.

Other objects of the invention and numerous advantages derived from the simplified nature thereof will be made apparent from the following description, reference being made to the accompanying drawings, in which—

For convenience in disclosing the nature and principle of my invention, the drawings exhibit the invention embodied in a machine of the Dalton type, certain views of the drawings showing so much of the structure and mechanism of the Dalton machine as will suffice to show the connection of the invention therewith. For instance, in a Dalton adding machine, the differential stop pins 1 are moved to effective position by the cooperation of the carriage 2 and the numeral key devices 3. In their raised positions, the pins 1 are effective to control the recording and adding mechanism of the machine. The recording mechanism shown comprises type carriers 4 swinging from a shaft 5 to present the type 6 opposite the platen 7 for operation by hammers 8. The type carriers are actuated by springs 9 and are associated with racks 10, actuated by springs 11 in transferring operations. The racks operate the adding pinions 12 in adding, transferring and clearing operations. The carriage 2 is stepped toward higher numerical orders under control of an escapement mechanism 13. The escapement mechanism 13 is given its stepping movements by a universal bar 14 under control of the keys 3. The normal or starting position of the carriage is toward the right of the machine relative to the operator who works facing the machine. In such position of the carriage the pins 1 are out of position to control the recording and adding mechanism. Movement of the carriage is necessary to place the pins in effective position. The general relationship of this structure is embodied in the Dalton adding machine, and is disclosed in Hubert Hopkins Patent, No. 1,039,130, dated September 24, 1912.

As well known, the carriage 2 of a Dalton adding machine, when in its home or starting position, supports the first row of pins therein above the longitudinal row of hammers or tappets 15 alined at the ends of the numeral key levers 3, so that when any one of the key levers is operated the corresponding pin in the first row of pins in the carriage will be raised and the carriage moved one step toward higher numerical orders to place the raised pin in effective position, relative to the type-carrier and rack in lowest numerical order. It is also a familiar fact that when the carriage is returned to its home or starting position after each operation, the carriage is given a slight overthrow movement to the right beyond its home or starting position to cause the pin restoring devices to restore all of the pins 1 to their idle positions. But the carriage immediately moves from its overthrow position to the position in which the pins of the first row are supported above the tappets 15, where the carriage remains until one or more numeral keys are operated. In the Fig. 4 the carriage occupies its overthrow position in which the first row of pins is at the right of the tappets 15; while in Fig. 3 the carriage is in its normal home or starting position. When the present invention is actively used for multiplication work, the carriage is latched in its overthrow position after each operation and while in such position, the numeral key devices are locked against operation. In addition the pin restoring device is controlled to prevent the pins from being depressed in the pin carriage, leaving the pins in their raised position, so that the carriage may be shifted at a single movement from its overthrow position, past the normal home or starting position, to position in which the set-up pins are effective to control the adding and recording mechanisms of the machine.

Figure 4:
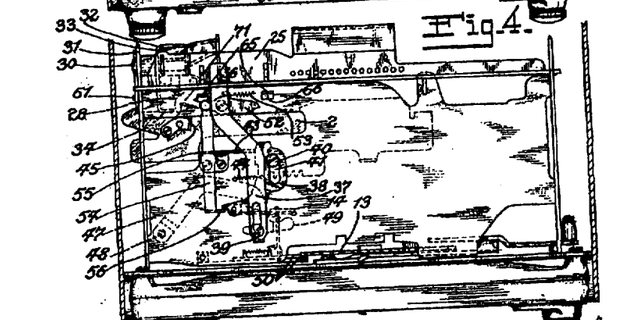
Fig. 4 is a rear elevation, showing the carriage in position which it occupies when the present invention is arranged or set to cooperate with the carriage to render the machine capable of use for multiplication, as hereinafter described.

To use the machine for multiplication work, the multiplicand is set up in the pin carriage by use of the numeral key devices 3, operated in the usual way. Before the carriage is returned to its position at the right of the machine the mechanism of the present invention is adjusted for use by setting an arm 16 so that it will engage a shouldered part 17 on the carriage 2 when the carriage is moved past its normal home or starting position to the overthrow position mentioned, thereby latching the carriage in the overthrow position. The arm 16 is mounted on a pivot 18 on a stationary support and is actuated in a direction to engage the shouldered part 17 by a spring 19. A key lever 20 equipped with a key 21 (Figs. 1 and 2) is pivotally supported by a part 22 and has an arm 23, to which the forward end of a link 24 is connected. The link 24 extends toward the rear of the machine and has its rear end guided within a slot in the stationary plate 25. The rear end of the link 24 is capable of a slight vertical movement in the slot in the plate 25 within which it operates. The link 24 has a laterally extended lug 26 which is in front of a projection 27 on the plate 25 when the link is in its lower position. This makes it necessary to raise the rear end of the link 24 before the key 21 can be operated. For this purpose a bell crank lever 28 is pivoted on the plate 25 and has one arm extending under the link 24 and the other arm extending downwardly in position to be engaged by a cam 29 on the carriage 2 when the carriage is moved to, or is in, the overthrow position (Fig. 4). The rear end of the link 24 will thereby be held in position in which the lug 27 is above the projection 27 so long as the carriage is latched in its overthrow position by engagement of the lever 16 with the shouldered part 17. In the raised position of the link 24, the lug 26 will pass over the projection 27, thus permitting the key 21 to be depressed to move the link 24 rearwardly.

A screw 30 is supported in a stationary plate 31 which also supports the pivot 18 of the lever 16. The screw 30 supports a bell crank lever 32, having a depending arm 33 from which a projection 34 extends behind a shoulder 35 on the link 24. Another arm 36 of the bell crank lever 32 extends rearwardly into a slot in the upper end of a link 37, operatively supported behind the plate 25. When the link 24 is moved rearwardly by depression of the key 21, the arm 36 of the bell crank lever 32 is raised, thereby raising the link 37. A plate 38 is connected with the lower end of the link 37 by a screw 39 and is guided in its vertical movement by a screw 40, passing through a slot 41 in said plate and secured to a stationary part of the machine. When the link 37 is raised, it lifts the plate 38 from the position shown in Fig. 4 to the position shown in Fig. 5. When the plate 38 is raised a shoulder 42 thereon engages a latch member 43 and is yieldingly held in connection with the latch member by a spring 44. The slot 41 is wide enough to permit the necessary oscillation of the plate 38 for movement into and out of engagement with the latch member 43. The carriage 2 supports a projection 45 which passes over the upper end of the plate 38 when said plate is in its lower position; that is, when the present invention is out of use. But when the multiplying key 21 is depressed and, as a consequence, the plate 38 is latched with the latch member 43, the upper end of said plate 38 is in position to be engaged by the projection 45 on the carriage 2 so as to stop the carriage in its tabulated movement. The momentum of the carriage in its tabulated movement will unlatch the shoulder 42, permitting the plate 38 to drop to its original position when the multiplying key 21 is released, leaving the carriage under control of the numeral key mechanism. The screw 39 extends through a slot 46 in the supporting plate and is connected with an arm 47 pivoted on a support 48. The arm 47 has an extension 49 under the universal escapement bar 14, so that when the multiplying key 21 is depressed, the pawls 50 of the escapement mechanism are rendered ineffective and the carriage is permitted to move by one movement until stopped by contact of the projection 45 with the abutment plate 38. When the multiplying key 21 is released, and the link 42 drops to its initial position, the escapement pawls 50 re-engage with the controlled part of the escapement mechanism. The carriage is thereby retained in one position for as many successive operations of the adding and recording mechanisms as may be needed in the example being worked. When stepping movements of the carriage toward higher orders under control of the zero key of the machine is needed, such stepping movement can be obtained by operation of the zero key in the usual way. After the desired number of operations have been performed, the carriage is returned to its overthrow position in the usual way, in which position the carriage will be retained by engagement of the arm 16 with the shouldered part 17, ready for another operation under control of the multiplying mechanism.

Figure 1:
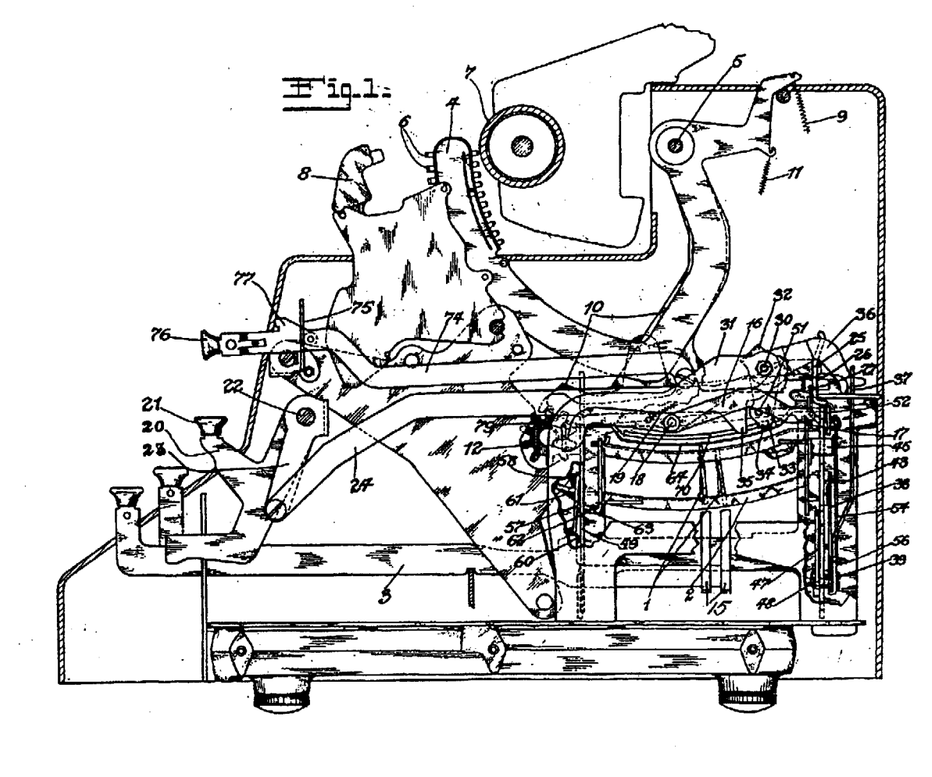
Fig. 1 is a side elevation showing the present invention embodied in a machine of the Dalton type.
Figure 2:
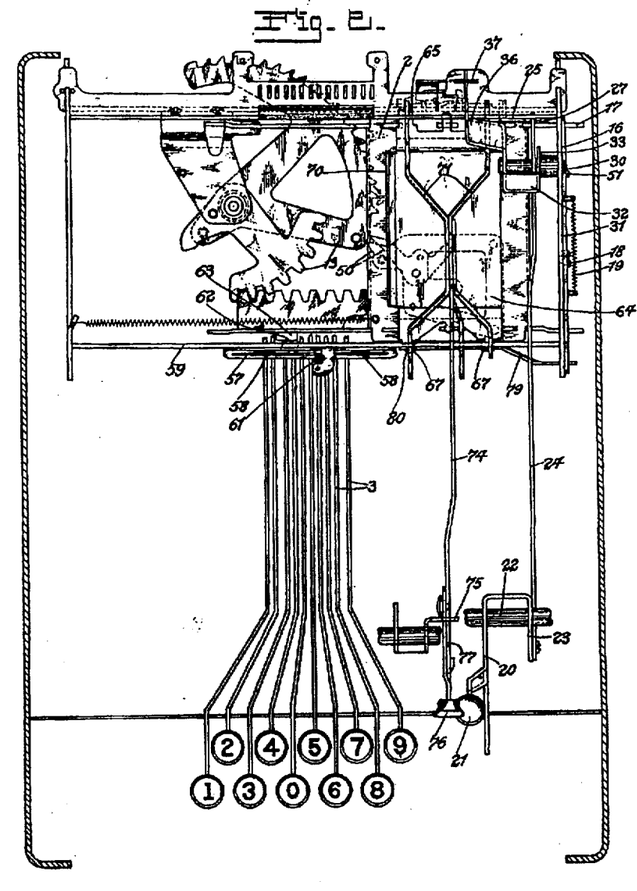
Fig. 2 is a plan view showing the mechanism of the present invention for controlling the carriage that sets the differential stops to permit the carriage to move to a predetermined effective position.

A pin 51 on the arm 33 of the lever 32 extends under the latch arm 16 (Fig. 1). As a consequence of the rearward movement of the lever arm 33, imparted thereto by the shoulder 35 on the link 24, the arm 16 will be raised out of latching engagement with the shouldered part 17 whenever the multiplying key 21 is depressed. This release of the arm 16 from engagement with the shouldered part 17 is timed so that the stop plate 38 becomes latched with the part 43, and so that the escapement pawls 50 are disconnected from the controlled part of the escapement, before the arm 16 is disengaged from the shouldered part 17.

Figure 3:
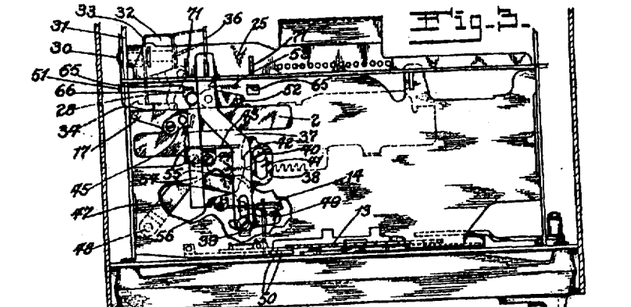
Fig. 3 is a rear elevation, showing the carriage control mechanism in its normal position.
Figure 5:
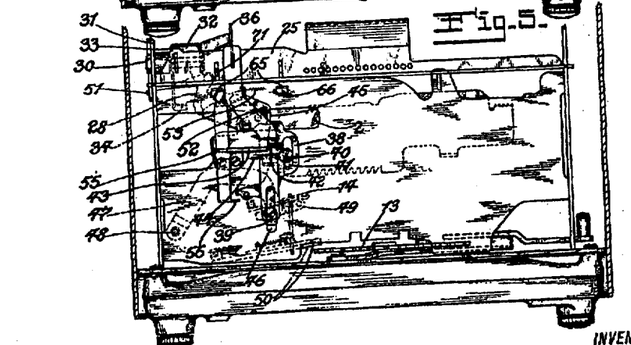
Fig. 5 is a rear elevation, showing the position of the parts after the carriage has been set in operative position by use of the present invention.

To prevent rebound of the carriage towards its home position, when the movement of the carriage is stopped by the stop plate 38, an abutment under control of the multiplying mechanism is provided. As shown a latch 52 is pivotally supported by a stationary part of the machine and is movable to and from position to engage behind the projection 45 on the carriage 2 (Figs. 3, 4 and 5). A spring 53 connected with the latch plate 52 actuates the latch plate to position behind the projection 45. When the multiplying mechanism is not in use the latch plate 52 does not operate. A link 54 operating in a guide 55, has its upper end pivoted to a latch plate 52 and its lower end provided with a projection 56, extending under an arm of the plate 38. Thus, when the plate 38 is in its lower position (Figs. 3 and 4), the link 54 is held down and the latch plate 52 is held up preventing said latch plate from engaging behind the projection 45. So, when the machine is used for ordinary adding and listing purposes, and when the multiplying mechanism is not in use, the latch plate 52 is not operated; but as an incident to the depression of the multiplying key 21, and when the latch plate 38 is raised, the spring 53 depresses one end of the latch plate 52 to the position shown in Fig. 5. The projection 45 on the carriage 2 passes beyond a shouldered part of the latch plate 52 so that rebound of the carriage toward its home position is prevented.

Figure 6:
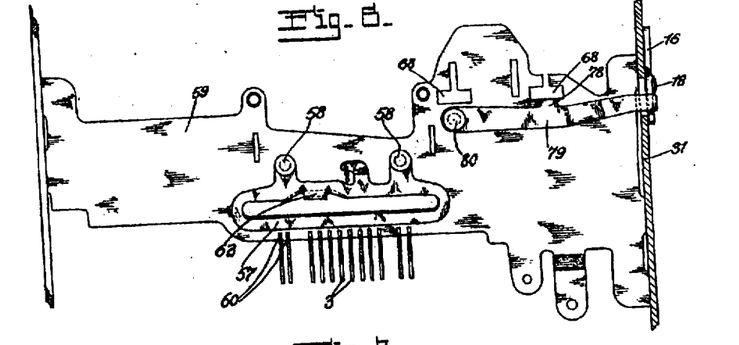
Fig. 6 is a cross sectional view showing a front elevation, the numeral key locking device and a part of the equipment for clearing the differential mechanism, while the carriage is in the position it occupies when under control of the present invention.

It is desirable to lock the numeral key mechanism against operation when the multiplying mechanism is placed in use. As shown (Fig. 6), a locking bar 57 extending transversely of the levers of the key mechanism 3 is pivotally mounted on supports 58 in connection with a fixed part 59. The levers of the key mechanism 3 have shoulders 60. A spring 61 in connection with the lock bar 57 normally holds the lock bar close against the plate 59 behind and out of the way of the shoulders 60, leaving the key mechanism free to operate. A projection 62 in connection with the lock bar extends through a slot in the plate 59 in position to be engaged by a cam 63 supported by the carriage 2, when the carriage is in its overthrow position. The cam 63 does not engage the projection 62 at any time when the carriage is out of its overthrow position. Thus, when the multiplying mechanism is not in use, the carriage is not retained in its overthrow position, and the cam 63 does not retain engagement with the projection 62, as a consequence of which the lock bar 57 does not interfere with the operation of the key mechanism 3. But so long as the carriage is in its overthrow position, the cam 63 by engagement with the projection 62, holds the lock bar 57 forwardly in opposition to the spring 61, holding the lock bar 57 immediately above in the path of movement of the shoulders 60, thus preventing operation of the numeral key mechanism so long as the carriage remains in its overthrow position.

Figure 7:
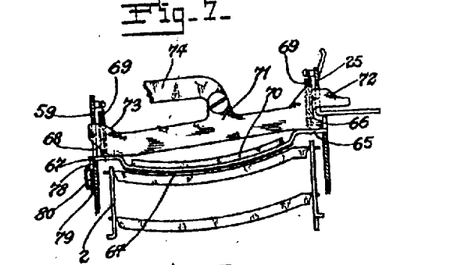
Fig. 7 is a view showing the device for clearing the differential mechanism after the same has been operated to perform its function.

The device by which the pins in the carriage 2 are depressed, as an incident to the movement of the carriage to its home or starting position when the multiplying mechanism is not in use and which is disabled so that it will not depress the pins in the carriage when the multiplying mechanism is placed in use, is an important feature of the present invention. A plate 64 is supported for vertical movement and adjustment above the home or starting position of the carriage 2. Said plate has projections 65 on its rear end operating in slots 66 in a stationary plate, and has similar projections 67 on its forward end operating in slots 68 in the plate 59. Springs 69 tend to raise the plate 64 high enough to permit the carriage 2 to pass under the plate without depressing the pins 1 in the carriage. If the plate 64 be held in its lower position (Fig. 7), the raised pins in the carriage will contact with the upturned edge 70 on the plate 64 as the carriage moves toward its home or starting position, and the raised pins will be depressed thereby. When the machine is used for ordinary work of addition or calculation, the plate 64 is held in its depressed or lower position; so that the pins 1 are pressed down in the carriage every time the carriage returns to its home or starting position. But when the multiplying mechanism is placed in use, the plate 64 is raised so that the set up pins in the carriage 2 will not engage the plate 64 as the carriage moves thereunder.

The cam device for pressing the plate 64 down in opposition to the power of the springs 69 is included in the invention. As shown, the cam device comprises a pair of sliding members 71, having rear ends operative within slots in the plate 6, and their forward ends operative within slots in the plate 59. Cams 72 on the rear ends of the members 71 and similar cams 73 on the forward ends of said members are arranged to operate against the uper walls of the slots within which the members 71 move, so as to depress said members when they are moved rearwardly. The cam members 71 rest upon the plate 64, so that rearward movement of said cam members will push the plate 64 downwardly, to position to be engaged by the pins 1 when the carriage 2 moves to its home or starting position. A link 74 has its rear end pivoted to the cam members 71 and its forward end operating within a guide 75 and provided with a key 76. A shoulder 77 on the link 74 is arranged to be engaged with the guide 75 when the link 74 is pushed rearwardly, in order to hold the pin restoring plate 64 in its lower position when it is desired to restore the pins 1 to unset positions at each operation of the machine.

Figure 8:
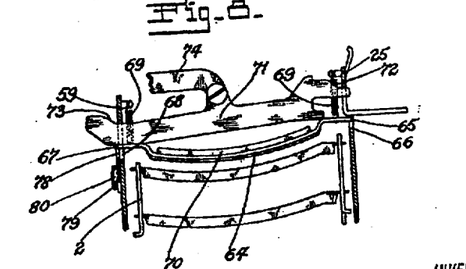
Fig. 8 is a similar view, showing the parts before the clearing device has been operated.
Figure 9:
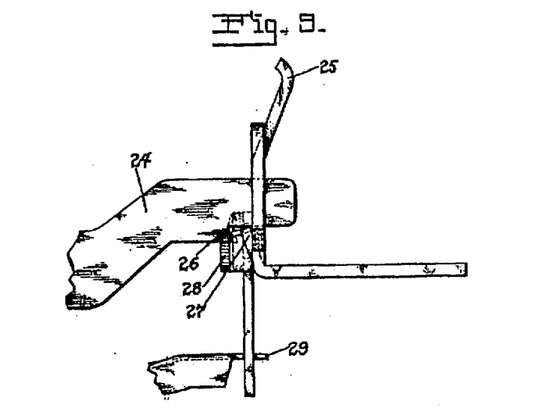
Fig. 9 is a view showing some of the details of the devices forming part of the multiplying mechanism, by which the multiplying mechanism is prevented from operation when the machine is in condition for use for work of ordinary addition and calculation.
Figure 10:
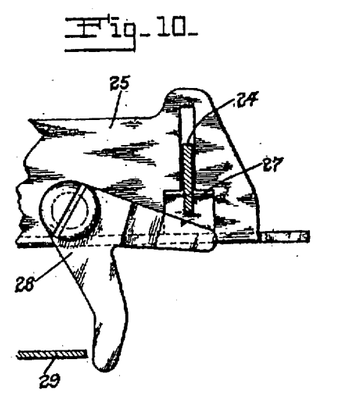
Fig. 10 is another view of the devices shown in Fig. 9, the multiplying mechanism being locked.
Figure 11:
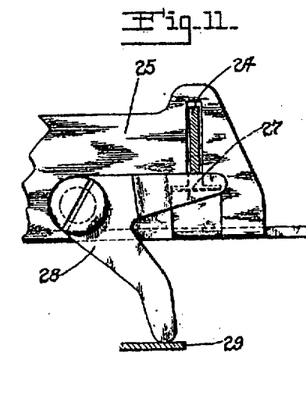
Fig. 11 is a view similar to Fig. 10 except that the multiplying mechanism is unlocked.

One of the projections 67 of the pin restoring plate 64 is above a projection 78 (Figs. 6, 7, and 8) on a lever 79. The inner end of the lever 79 is pivoted at 80 and the outer end of said lever extends over the forward end of the arm 16 in front of the pivot 18 of said arm (Fig. 1). As a consequence of this arrangement, depression of the pin restoring plate 64 by operation of the key device 74—76 not only pushes down the pins 1 in the carriage 2 but also raises the arm 16 out of engagement with the shouldered part 17. This permits the carriage to move over from its overthrow position to its normal or home position. The machine is thus "normalized" ready for use in ordinary work of addition or calculation, so that the pins 1 will be depressed at each return of the carriage 2 to its home or starting position.

From the foregoing it is clear that my invention greatly facilitates the work of multiplication in any machine in which a constant multiplicand may be set up and used successively in different examples. The invention requires comparatively few additional parts in the machine and requires only slight modification of the machine in which the invention is embodied. I contemplate varying the form and arrangement of the parts and the relative positions thereof to any extent desirable to accommodate the invention to the mechanisms in any machine in which it is to be used. I do not restrict myself to unessential features either in the construction, arrangement or mode of operation, but make claim to the invention commensurate with the scope of the novelty and utility thereof.

What I claim and desire to secure by Letters Patent is:—

1. In a machine of the character described, the combination of a laterally movable carriage, digit pins in the carriage, mechanism for setting the pins and for causing the carriage to move the set pins laterally to proper denominational order positions, a device settable in position to engage the pins to unset them, and optional means for setting said device in position to engage and unset the pins.

2. In a machine of the character described, the combination of a carriage movable from and to a starting position, digit pins in the carriage, mechanism for setting the pins to represent numbers and for moving the carriage to and from effective positions, and a device for returning the digit pins to unset positions when the carriage is moved to starting position, or not, as desired.

3. In a machine of the character described, the combination of a carriage, digit pins in the carriage, keys for setting the digit pins to represent numbers, means controlled by the carriage that supports the pins moving said pins laterally to proper denominational orders as an incident to the setting of the pins by the keys, a movable device for unsetting the pins, and means for moving said device into engagement with the pins to unset the pins.

4. In a machine of the character described, the combination of a carriage, digit pins in the carriage, escapement mechanism for moving the carriage, key mechanism for setting the pins and for controlling the escapment mechanism to move the carriage, additional mechanism for controlling the escapment mechanism and the movement of the carriage, and a lock for locking the key mechanism when the escapement mechanism is under control of said additional mechanism.

5. In a machine of the character described, the combination of digit pins, keys for setting the digit pins, a device movable into engagement with the digit pins to unset them, and means for operating said device.

6. In a machine of the character described, the combination of a carriage movable from home position to effective position and from effective position past home position to an overthrow position, a latch for latching said carriage in the overthrow position, and means for unlatching said latch to permit the carriage to move from its overthrow position past its home position to effective position.

7. In a machine of the character described, the combination of a carriage movable from home position to effective position and from effective position past said home position to an overthrow position, digit pins in the carriage settable to represent numbers, a latch for latching said carriage in the overthrow position, and means for unlatching the latch to permit the carriage to move from its overthrow position to a predetermined effective position.

8. In a machine of the character described, the combination of a carriage movable from home position to effective position and from effective position past said home position to an overthrow position, digit pins in the carriage settable to represent numbers, a latch for latching said carriage in the overthrow position, means for unlatching the latch to permit the carriage to move from its overthrow position to a predetermined effective position, and a device for unsetting the pins as an incident to the movement of said carriage to its home position.

9. In a machine of the character described, the combination of a carriage, movable from home position to effective position and from effective position past said home position to an overthrow position, digit pins in the carriage settable to represent numbers, a latch for latching said carriage in the overthrow position, means for unlatching the latch to permit the carriage to move from its overthrow position to a predetermined effective position, a device for unsetting the pins as an incident to the movement of said carriage toward its home and overthrow positions, and means for preventing said device from unsetting the pins when the carriage moves to said overthrow position.

10. In a machine of the character described, the combination of a carriage movable to and from effective position, digit pins in the carriage settable to represent numbers, a latch for latching the carriage out of effective position, an escapement for controlling movement of the carriage to effective position, and means for unlatching said latch and disabling the escapement to permit the carriage to move to effective position.

11. In a machine of the character described, the combination of a carriage movable to and from effective position, digit pins in the carriage settable to represent numbers, a latch for latching the carriage out of effective position, an escapement for controlling movement of the carriage to effective position, means for unlatching said latch and disabling the escapement to permit the carriage to move to effective position, and a stop settable by said means for stopping the carriage in effective position.

12. In a machine of the character described, the combination of a carriage movable to and from effective position, digit pins in the carriage settable to represent numbers, a device for unsetting the pins as an incident to the movement of the carriage from effective position, means for moving said device to position in which it will not unset the pins when the carriage moves from effective position, and means for moving said device to position to unset the pins when the carriage moves from effective position.

13. In a machine of the character described, the combination of a carriage movable from a starting position to an effective position, escapement mechanism controlling the movement of the carriage to effective position for certain examples, means for disabling the escapement device to permit the carriage to move to an effective position for other examples, a stop settable by said means for stopping the carriage in effective position, and means for preventing rebound of the carriage when it is stopped in effective position by said stop.

14. In a machine of the character described, the combination of a carriage movable to and from effective position, digit pins in the carriage settable to represent numbers, keys for setting the pins in the carriage to represent numbers, an escapement under control of the keys for controlling movement of the carriage to effective position, mechanism independent of said keys for controlling the escapement to permit movement of the carriage to effective position, and means for preventing operation of said independent mechanism when the escapement is under control of said keys.

15. In a machine of the character described, the combination of a carriage movable to and from effective position, digit pins in the carriage settable to represent numbers, keys for setting the pins in the carriage to represent numbers, an escapement under control of the keys for controlling movement of the carriage to effective position, mechanism independent of said keys for controlling the escapement to permit movement of the carriage to effective position, and means for preventing operation of said keys when said escapement is under control of said independent mechanism.

16. In a machine of the character described, the combination of a carriage movable to and from effective position, digit pins in the carriage settable to represent numbers, keys for setting the pins in the carriage to represent numbers, an escapement under control of the keys for controlling movement of the carriage to effective position, mechanism independent of said keys for controlling the escapement to permit movement of the carriage to effective position, and devices for preventing operation of said independent mechanism when the escapement is under control of said keys, and for preventing operation of said keys when the escapement is under control of said independent mechanism.

17. In a machine of the character described, the combination of a carriage movable to and from effective position, digit pins in the carriage settable to represent numbers, keys for setting the pins in the carriage to represent numbers, an escapement under control of said keys for controlling movement of the carriage to effective position, independent mechanism for controlling said escapement to permit the carriage to move to effective position after said pins have been set by said keys, a device for unsetting the pins in the carriage as an incident to movement of the carriage from effective position, and means for preventing said device from unsetting the pins when the carriage moves from effective position.

18. In a machine of the character described, the combination of a carriage movable to and from effective position, an escapement controlling movement of the carriage to effective position, devices for permitting the carriage to move to effective position out of control of the escapement, a stop settable by said devices to stop the carriage in effective position, and an element controlled by said devices to prevent rebound of the carriage when the carriage is stopped by said stop.

19. In a machine of the character described, the combination of a carriage movable to and from effective position, an escapement for controlling movement of the carriage to effective position, devices for disconnecting the escapement to permit movement of the carriage to effective position out of control of the escapement, means for preventing operation of said devices, and an element operated by the carriage to position to enable said devices to operate.

20. In a machine of the character described, the combination of a carriage movable to and from effective position, an escapement for controlling movement of the carriage to effective position, devices for disconnecting the escapement to permit movement of the carriage to effective position out of control of the escapement, means for preventing operation of said devices, a lever for enabling said devices to operate, and means operated by the carriage for actuating said lever.

21. In a machine of the character described, the combination of a carriage movable to and from a normal or home position, an escapement for controlling movement of the carriage, numeral key mechanism for controlling the escapement to move the carriage from said home position, a latch for latching the carriage out of said home position, and mechanism for releasing said latch and for controlling said escapement to permit the carriage to move from the position in which it was latched independently of the control of the escapement.

22. In a machine of the character described, the combination of a carriage movable to and from a normal or home position, an escapement for controlling movement of the carriage, numeral key mechanism for controlling the escapement to move the carriage from said home position, a latch for latching the carriage out of said home position, mechanism for releasing said latch and for controlling said escapement to permit the carriage to move from the position in which it was latched independently of the control of the escapement, and means for locking the numeral key mechanism against operation when said carriage is held by said latch.

WALTER WM. LANDSIEDEL.